G. W. SEVERANCE.
Oatmeal-Machine.
No. 211,112. Patented Jan. 7, 1879.
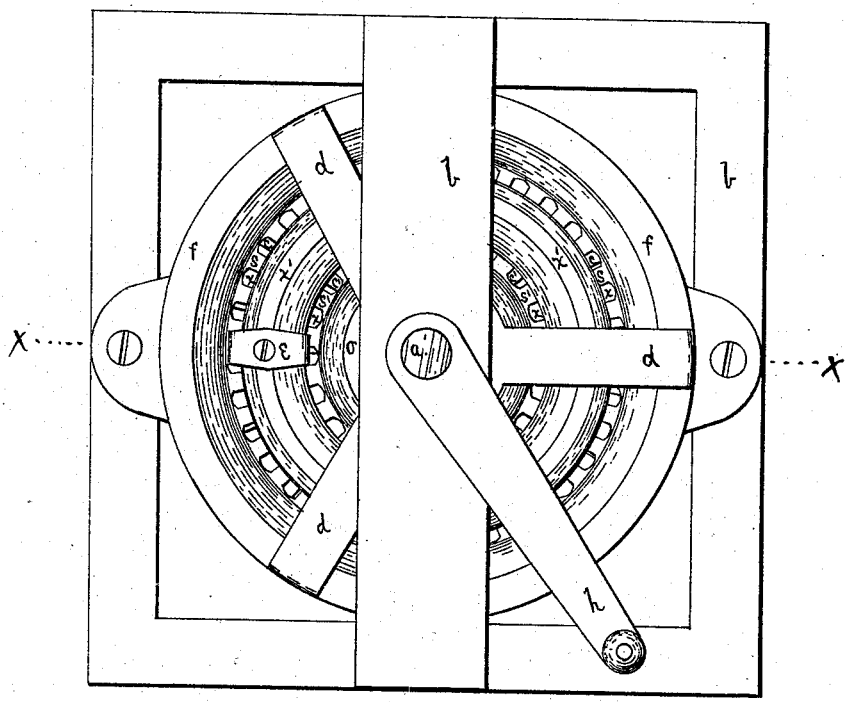
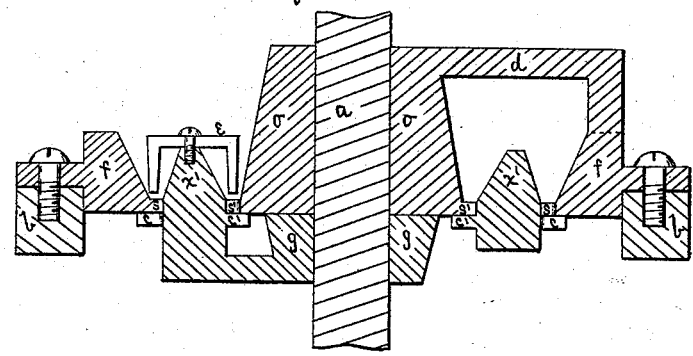

UNITED STATES PATENT OFFICE.

GEORGE W. SEVERANCE, OF RAVENNA, OHIO, ASSIGNOR TO HIMSELF, DAVID B. KINGSBURY, SAMUEL F. BUTTS, AND JOHN QUAYLE, OF SAME PLACE.

IMPROVEMENT IN OATMEAL-MACHINES.

Specification forming part of Letters Patent No. 211,112, dated January 7, 1879; application filed March 4, 1878.

*To all whom it may concern:*

Be it known that I, GEORGE W. SEVERANCE, of Ravenna, Portage county, Ohio, have invented a new and useful Improvement in Oatmeal - Machines, which improvement is fully set forth in the following specification, reference being had to the accompanying drawings.

My invention relates to the process of cutting the hulled kernels of oats into a coarse meal.

The object of my invention is to cut the oat-kernels while they are dropping endwise through notches in the flange of a horizontal stationary wheel or ring by means of a horizontally-revolving wheel, carrying radial knives, directly beneath and in contact with the horizontal flange of the stationary wheel.

In the drawing, Figure 1 is a plan view of the machine. Fig. 2 is a cross-section of the same, showing the operative parts at the dotted line $x\ x$ in Fig. 1.

The crank $h$ is attached to the shaft $a$, which turns in frame $b$. The shaft $a$ turns loose in wheel $o$, which is rigidly attached to frame $b$. The rim $f$ and the hub of wheel $o$ are connected at the top by spokes $d\ d\ d$, and at the bottom of wheel $o$ it has notched flanges $s\ s'$ on its rim and hub. Wheel $g$ is keyed to shaft $a$, and rotates with it. Its rim $x'$ projects upward, filling the space between flanges $s\ s'$, and rotates in contact with the edges of the flanges. The rim $x'$ is connected by spokes with the hub of wheel $g$. It carries two series of radial knives, $c\ c'$, surrounding it on its exterior and interior sides. These knives revolve with wheel $g$, in contact with the under sides of flanges $s\ s'$, and cut the oats, which drop endwise through the notches $x$ in flanges $s\ s'$. The hub of wheel $o$ and the interior side of its rim $f$ converge downward to the flanges $s\ s'$, and the sides of rim $x'$ converge upward from the flanges, so that when the oats fall from a hopper into wheel $o$ they are conducted by these converging sides onto the notched flanges $s\ s'$. The size of notches $x$ is such that the apertures formed by the contact of the edges of flanges $s\ s'$ with rim $x'$ are of sufficient size to permit the oat-kernels to pass through them only endwise, while the radial knives $c\ c'$ on rim $x'$ of the rapidly-revolving wheel $g$ cut off the oats as they project beneath the flanges $s\ s'$. One or more agitators, $e$, attached to the top of rim $x'$, with its ends projecting downward into the oats, is carried by the rotating wheel $g$, and assists the oats in entering the apertures formed by the contact of rim $x'$ with the notched flanges $s\ s'$.

I claim as my invention—

1. The stationary wheel $o$, having one or more rings, $f$, and hub, with perpendicularly-notched flanges $s\ s'$, in combination with the rotating wheel $g$, having one or more rings, $x'$, with circular unnotched sides to turn in contact with flanges $s\ s'$, and carrying the radial knives $c\ c'$, the sides of rings $f$ and $x'$ being converging down to the flanges, substantially as and for the purpose described.

2. The rotating wheel $g$, having the circular unnotched rim or ring $x'$, with the agitator $e$, attached to its top and the radial knives $c\ c'$ to its base, in combination with the stationary wheel $o$, having the rim or ring $f$, and hub, with notched flanges $s\ s'$, substantially as described.

GEO. W. SEVERANCE.

Witnesses:
A. D. KNAPP,
GEORGE F. ROBINSON.